United States Patent [19]

Gladieux et al.

[11] Patent Number: 5,551,555
[45] Date of Patent: Sep. 3, 1996

[54] GUIDE SYSTEM FOR PACKAGES ON A CONVEYOR SYSTEM

[75] Inventors: Michael J. Gladieux; Daniel A. Pollock, both of Perrysburg, Ohio

[73] Assignee: Roe, Incorporated, Perrysburg, Ohio

[21] Appl. No.: 550,338

[22] Filed: Oct. 30, 1995

[51] Int. Cl.$^6$ ................................................. B65G 21/20
[52] U.S. Cl. .................. 198/836.3; 198/633; 198/860.5
[58] Field of Search ............................. 198/836.1, 836.3, 198/836.2, 633, 860.5, 599, 860.3

[56] References Cited

U.S. PATENT DOCUMENTS

| | | | |
|---|---|---|---|
| 1,857,566 | 5/1932 | Perry | 198/836.3 |
| 2,156,020 | 4/1939 | Lathrop | 198/836.3 |
| 2,229,605 | 1/1941 | Snyder et al. | 198/836.3 |
| 2,837,203 | 6/1958 | Resser | 198/860.5 |
| 3,527,336 | 9/1970 | Johnston | 198/836.3 |
| 4,029,197 | 6/1977 | Clarke et al. | 198/633 X |
| 5,099,979 | 3/1992 | Kehrel | 198/836.3 X |
| 5,161,678 | 11/1992 | Garvey | 198/860.5 X |
| 5,186,333 | 2/1993 | Pierson et al. | 198/860.5 |

FOREIGN PATENT DOCUMENTS 1452247  10/1976  United Kingdom ................ 198/836.3

OTHER PUBLICATIONS

Airtrans Air Conveyor Systems brochure dated Apr., 1993.

*Primary Examiner*—James R. Bidwell
*Attorney, Agent, or Firm*—MacMillan, Sobanski & Todd

[57] ABSTRACT

A guide system for packages on a conveyor system includes a generally linear guide member. The guide member aligns the packages as they move along the conveyor system. A generally linear control member is connected to the guide member and lies generally parallel thereto. The control member can be rotated around its longitudinal axis to move the guide member in a generally arcuate path. This causes adjustment of the guide member to accommodate different sizes of packages.

20 Claims, 7 Drawing Sheets

GUIDE SYSTEM FOR PACKAGES ON A CONVEYOR SYSTEM

BACKGROUND OF THE INVENTION

This invention relates in general to conveyor systems for packages, and in particular to a guide system for packages on a conveyor system.

A conveyor system for packages is a means for moving packages from one location to another. For example, the packages may be moved during a manufacturing operation, for assembly into a larger container, for storage in a warehouse, or for shipment. Two conventional types of conveyor systems are air lift conveyors and belt conveyors. An air lift conveyor moves the packages on an air stream by use of directional jets. A belt conveyor moves the packages on an endless belt.

The conveyor system usually includes a guide system for aligning the packages as they move along the conveyor. The guide system keeps the packages on the conveyor and keeps them straight so that they can be moved rapidly and efficiently. One type of conventional guide system includes guide rails positioned along the length of the conveyor. A belt conveyor usually includes two such guide rails positioned along the two sides of the endless belt. An air lift conveyor usually includes a third guide rail positioned along the upper surface of the packages.

Often a single conveyor system is used to move several different sized packages. When the packages are changed, the guide rails must be adjusted to accommodate the different sizes. In the past, the guide rails have usually been positioned on the conveyor system by a plurality of mounting brackets positioned along the length of the guide rails. Adjustment of the guide rails required individual adjustment of each of the mounting brackets. This usually involved manually loosening a fastener, moving the mounting bracket to its new position, and then tightening the fastener. Such individual adjustment of each of the plurality of mounting brackets required large amounts of time and labor. Significant production capacity was lost during the time required to make the changeover to a new package size.

It is also known to adjust a guide rail automatically by use of a rack and pinion type system which moves the guide rail horizontally. However, such a system is usually expensive, complicated, The intricate moving parts of a rack and pinion system may require lubrication, which is not compatible with some clean room environments.

Thus, it would be desirable to provide a guide system for packages on a conveyor system which overcomes the problems of the previous guide systems.

SUMMARY OF THE INVENTION

This invention relates to a guide system for packages on a conveyor system. The guide system includes a generally linear guide member for aligning the packages as they move along the conveyor system. A generally linear control member is connected to the guide member and lies generally parallel thereto. Preferably the control member is connected to the guide member by a plurality of arms extending therebetween, which are positioned along substantially the entire length of the guide member. The control member can be rotated around its longitudinal axis to move the arms. This causes substantially the entire length of the guide member to move in a generally arcuate path. The guide member is thereby adjusted to accommodate different sizes of packages. Preferably a lever is connected to the control member to cause its rotation, and the lever is adjustable to preselected positions which define preselected positions for the guide member.

The guide system of this invention can be easily and rapidly adjusted to accommodate different sizes of packages. This saves time and labor and can increase production capacity. The guide system is simple, inexpensive and reliable. Adjustments of the system are very repeatable because of the preselected positions for the guide member.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
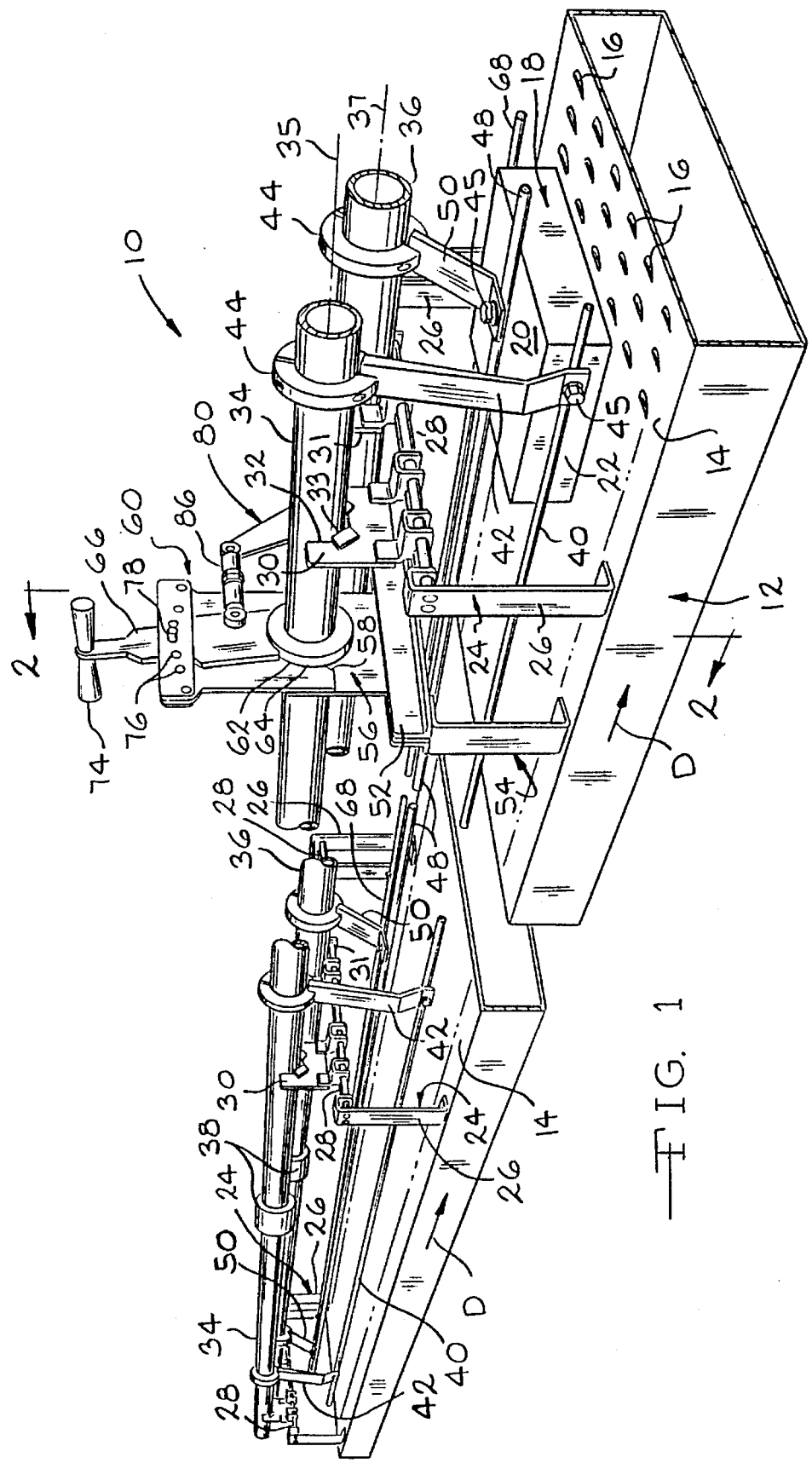
FIG. 1 is a perspective view of a conveyor system including a guide system in accordance with this invention.

Referring now to the drawings, there is illustrated in FIG. 1 a conveyor system indicated generally at 10. The conveyor system 10 includes an air lift conveyor 12. The conveyor 12 includes a conveying surface, such as an upper surface 14 which has directional jets 16 formed therein for moving packages on a stream of air. Alternatively, the conveyor system could include a belt conveyor or other type of conveyor. The preferred conveyor system 10 is generally straight and elongated. The conveyor system 10 can extend any desired distance, and is typically made up of sections which can be up to 100 feet (30.48 meters) long or longer. It is adapted to move packages such as package 18 along a direction D which is generally from left to right in the illustrated view. The package 18 has an upper surface 20 generally parallel to the upper surface 14 of the conveyor 12, and two side surfaces 22 (only one of which is shown) extending generally parallel to the direction D.

A plurality of frames 24 are mounted on the upper surface 14 of the conveyor 12 at intervals along its length. The frames 24 extend across the upper surface 14 generally perpendicular to the direction D. Each frame 24 includes a pair of vertically extending side members 26 and a horizontally extending cross member 28 connected therebetween. The cross member 28 can be a rod or other suitable structure.

A pair of supports 30 and 31 are positioned on top of each cross member 28. The supports 30, 31 are generally planar and extend upward from the cross member 28. Each support 30, 31 includes a generally semicircular recess 32 formed in its upper surface. Each of the supports 30, 31 is aligned with corresponding supports 30, 31 on the other flames 24 along the length of the conveyor, so that the recesses 32 are aligned.

A generally linear first control member such as first mounting tube 34 is positioned in the recess 32 of the support 30 on each frame 24. Preferably, two pieces of plastic 33 are positioned between the recess 32 and the mounting tube 34 to protect the surface of the mounting tube and to dampen vibration. A generally linear second control member such as second mounting tube 36 is positioned in the recess 32 of the other support 31 on each frame 24. Again, preferably two pieces of plastic (not shown) are positioned between the recess 32 and the mounting tube 36. The supports can be positioned at desired intervals along the length of the conveyor system to support the mounting tubes, for example at 10 foot intervals. Preferably each of the first and second mounting tubes 34 and 36 is generally shaped as an elongated tube having a generally circular cross section. Each mounting tube is preferably formed from a metallic material such as stainless steel. The mounting tubes preferably are in sections connected together by couplers 38, but they can also be single-piece tubes.

A generally linear first guide member such as first guide rail 40 is connected to the first mounting tube 34. Preferably the guide rail 40 is connected to the mounting tube 34 by a plurality of arms such as first mounting brackets 42 extending therebetween. Preferably the first mounting brackets 42 are positioned along substantially the entire length of the first guide rail 40. Each first mounting bracket 42 is connected to the first mounting tube 34 at a collar 44, although any suitable connection can be used. The mounting bracket 42 can be connected to the first guide rail 40 by any suitable means, such as a barlock 45. Other types of connectors can also be used.

Similarly, a generally linear second guide member such as second guide rail 48 is connected to the second mounting tube 36 by a plurality of arms such as second mounting brackets 50 extending therebetween. Preferably the second mounting brackets 50 are positioned along substantially the entire length of the second guide rail 48. Each second mounting bracket 50 is connected to the second mounting tube 36 at a collar 44, and it is connected to the second guide rail 48 by a connector such as a barlock 45.

The first and second guide rails 40 and 48 lie generally parallel to the first and second mounting tubes 34 and 36, respectively. Preferably each guide rail is generally shaped as an elongated bar having a generally circular cross section, and preferably it is formed from a metallic material such as stainless steel. If the conveyor system is made up of sections, the guide rails of successive sections should be in alignment. The guide rails and mounting brackets are preferably flexible to accommodate for any misalignment that may occur between successive sections of guide rails if adjustments to these sections are not simultaneous.

Because the first and second mounting tubes 34 and 36 are positioned in recesses 32 of supports 30 and 31, each of the first and second mounting tubes can be rotated around its longitudinal axis 35 and 37, respectively. As will be illustrated below, rotation of the first and second mounting tubes 34 and 36 causes the connected first and second guide rails 40 and 48 to move in a generally arcuate path to adjust the guide rails.

At one position along the conveyor system 10, a cross member 52 of a frame 54 is reinforced and extends upward a short distance. For purposes of illustration of the invention, the frame 54, frame 24 and mounting brackets 42 and 50 having been shown exaggeratedly close to one another. In operation, they would be longitudinally spaced apart at a desired distance, for example 8–10 feet (2.4–3.0 meters). A generally planar support 56 is connected to the cross member 52 and extends upward therefrom. The support 56 includes a generally semicircular recess 58 in its upper surface. An adjuster panel 60 is connected to the top of the support 56. The adjuster panel 60 is generally planar, and it includes a generally semicircular recess 62 in its lower surface. When the adjuster panel 60 is connected to the support 56, the recess 62 of the adjuster panel 60 combines with the recess 58 of the support 56 to form a generally circular aperture 64. The first mounting tube 34 extends through the aperture 64. The aperture 64 is aligned with the recesses 32 of the supports 30.

As will be explained more fully below in relation to FIGS. 2 and 4, the adjuster panel 60 also includes a plurality of apertures 76 formed therein positioned in an arc. A first lever 66 is mounted for generally arcuate movement within the adjuster panel 60 to cause rotation of the first mounting tube 34. The first lever 66 includes an aperture 79 (shown in FIG. 4). The aperture 79 can be aligned with one of the apertures 76 of the adjuster panel 60. A pin 78 is positioned through the aligned apertures 76 and 79 to fix their respective positions.

The conveyor system 10 also preferably includes a fixed guide rail 68 positioned along one side of the conveyor 12. The fixed guide rail 68 cooperates with the adjustable first and second guide rails 40 and 48 to align each package 18 during its movement on the conveyor 12.

It is important that the first and second guide rails 40 and 48 resist deflection by the packages after the guide rails have been adjusted to the desired position. Excessive deflection of the guide rails could cause misalignment of the packages on the conveyor. Therefore, preferably the first and second mounting tubes 34 and 36 each have sufficient rotational stiffness and flexural rigidity to resist deflection. The rotational stiffness and flexural rigidity can be adjusted by the diameter of the mounting tubes and by other design characteristics known to a competent engineer. The flexural rigidity may be further adjusted by varying the support spacing.

Figure 2:
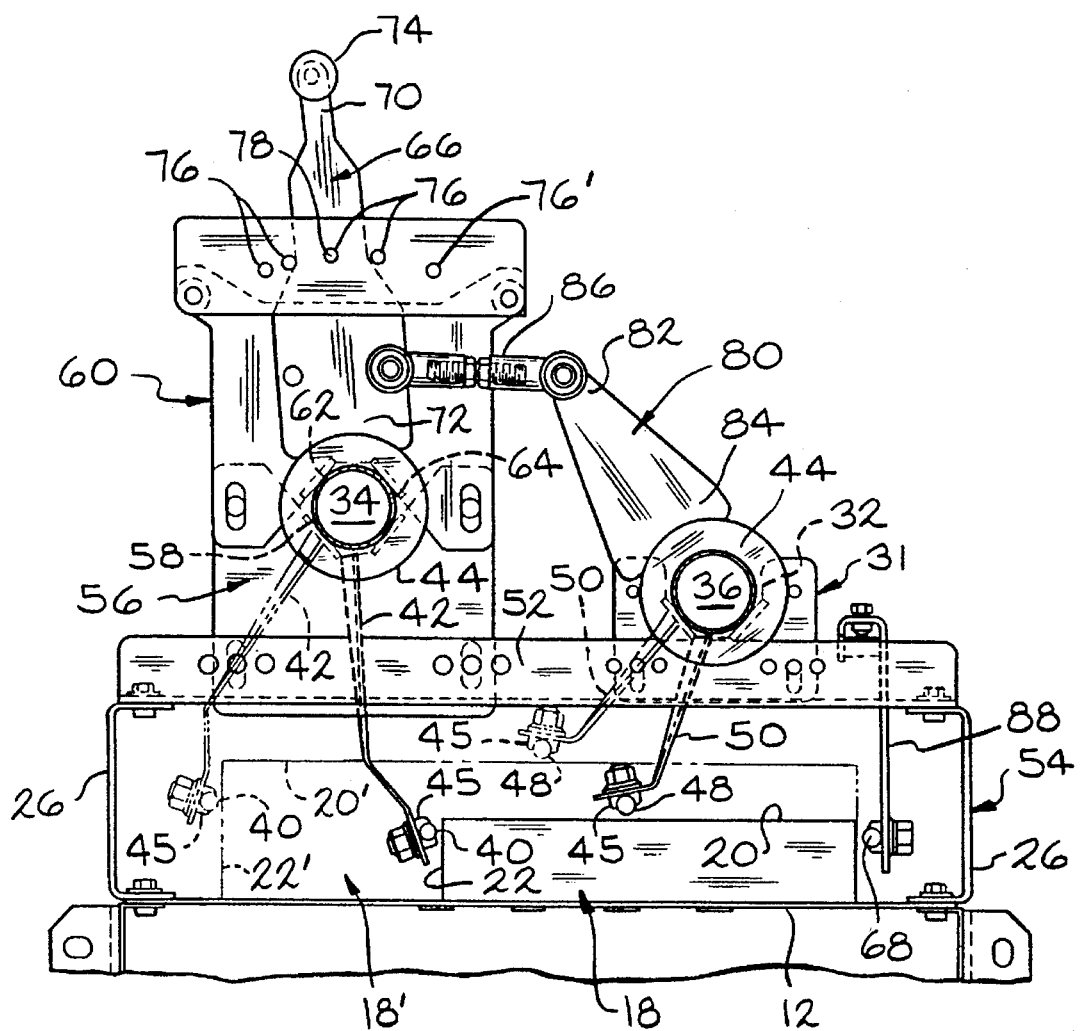
FIG. 2 is a cross-sectional view of the conveyor system taken at line 2—2 of FIG. 1.
Figure 4:
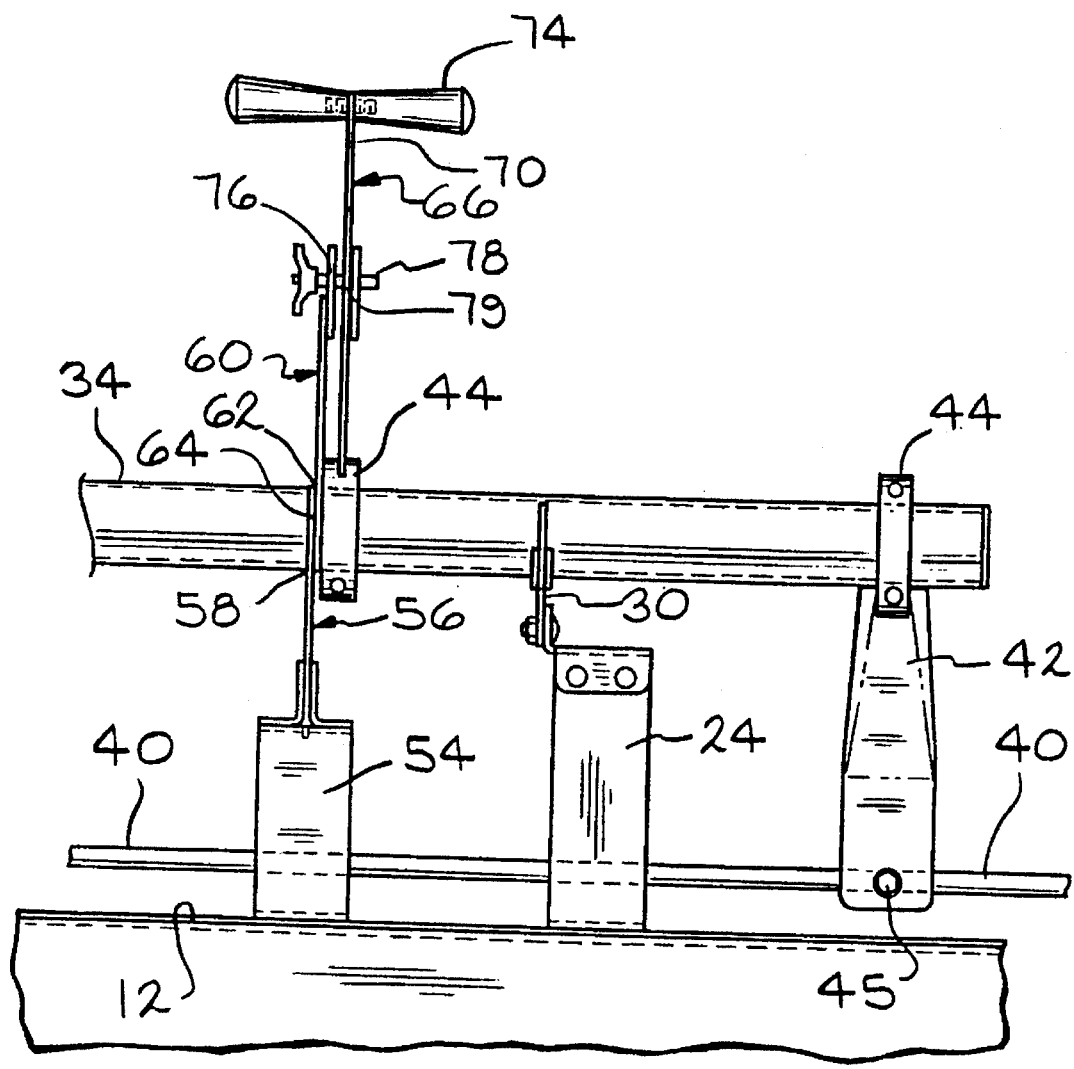
FIG. 4 is a side view of the adjuster panel and first lever of FIG. 1, and also showing a portion of the first control member connected by an arm to the first guide member.

Referring now to FIG. 2 along with FIG. 4, the adjuster panel 60, first lever 66 and associated structures are illustrated in more detail. A frame 54 mounted on the conveyor 12 includes a pair of side members 26 and a cross member 52 connected therebetween. The cross member 52 is reinforced and extends upward a short distance. A generally planar support 56 is connected to the cross member 52 and extends upward therefrom. The support 56 includes a generally semicircular recess 58 in its upper surface.

An adjuster panel 60 is positioned on top of the support 56 and connected thereto. The adjuster panel 60 is generally planar, and it includes a generally semicircular recess 62 in its lower surface. Thus, when the adjuster panel 60 is connected to the support 56, the recess 62 of the adjuster panel 60 combines with the recess 58 of the support 56 to form a generally circular aperture 64. A first mounting tube 34 extends through the aperture 64. A collar 44 is positioned around the first mounting tube 34.

A first lever 66 is mounted in the adjuster panel 60 to cause rotation of the first mounting tube 34. The first lever 66 includes an upper end 70 and a lower end 72. A handle 74 is attached to the upper end 70 to facilitate adjustment of the first lever 66. The lower end 72 of the first lever 66 is attached to the collar 44 positioned around the first mounting tube 34. Thus, movement of the first lever 66 causes rotational movement of the first mounting tube 34, and the first lever pivots in an arcuate motion about the first mounting tube.

The adjuster panel 60 includes a plurality of apertures 76 formed therein which are positioned in an arc. As can be seen in FIG. 4, the first lever 66 includes an aperture 79 which can be aligned with one of the apertures 76. A pin 78 is positioned through the aligned apertures 76 and 79 when the first lever 66 has been adjusted to fix their respective positions. In this manner, the first lever 66 can be adjusted to preselected positions. Other structures such as a protrusion and notches can also be used instead of the pin 78 and apertures 76 and 79.

A second support 31 is also positioned on top of the cross member 52. The support 31 includes a generally semicircular recess 32 formed in its upper surface. A second mounting tube 36 is positioned in the recess 32. A collar 44 is positioned around the second mounting tube 36.

A second lever 80 includes an upper end 82 and a lower end 84. The upper end 82 of the second lever 80 is connected to the first lever 66 by a linkage 86. The lower end 84 of the second lever 80 is attached to the collar 44 around the second mounting tube 36. Thus, movement of the second lever 80 causes rotational movement of the second mounting tube 36.

In the view of FIG. 2, a first guide rail 40 is shown behind the adjuster panel 60 at two alternate positions. The first guide rail 40 is connected to the first mounting tube 34 by a first mounting bracket 42 extending therebetween. The first mounting bracket 42 is connected to the first mounting tube 34 at a collar (not shown) positioned around the first mounting tube 34. The first mounting bracket 42 is connected to the first guide rail 40 by a barlock 45. Rotation of the first mounting bracket 42 causes the connected first guide rail 40 to move in a generally arcuate path to adjust the guide rail.

A second guide rail 48 is shown behind the support 31 in the view of FIG. 2, at two alternate positions. The second guide rail 48 is connected to the second mounting tube 36 by a second mounting bracket 50 extending therebetween. The second mounting bracket 50 is connected to the second mounting tube 36 at a collar (not shown) positioned around the second mounting tube 36. The second mounting bracket 50 is connected to the second guide rail 48 by a barlock 45. Rotation of the second mounting bracket 50 causes the connected second guide rail 48 to move in a generally arcuate path to adjust the guide rail.

Because the second lever 80 is connected to the first lever 66, the first and second mounting tubes 34 and 36 are interconnected so that one rotates dependent on rotation of the other. As a result, the first and second guide rails 40 and 48 connected thereto move together. Thus, the positioning and rotation of the first and second mounting tubes 34 and 36 can be coordinated so that the first and second guide rails 40 and 48 cooperate to align a package 18. Movement of the first lever 66 to the first preselected position shown in FIG. 2 adjusts each of the first and second mounting tubes 34 and 36 so that the first and second guide rails 40 and 48 correctly align the side surface 22 and the upper surface 20 of a first package 18, respectively. When the conveyor system is changed over for use with a second package 18', movement of the first lever 66 to a second preselected position, where the aperture 79 is aligned with the aperture 76', adjusts each of the first and second mounting tubes 34 and 36 so that the first and second guide rails 40 and 48 correctly align the side surface 22' and upper surface 20' of the second package 18'. Thus, by moving a single lever, the guide system is easily and rapidly adjusted to accommodate a different size of package. Moreover, because the mounting tubes and guide rails preferably extend substantially the entire length of the conveyor system, the entire conveyor system is changed over. There is no need to individually adjust a plurality of mounting brackets like in the conventional guide system. The first and second mounting tubes can rotate the same or differently, and can be positioned at different locations, depending on the particular shape and size of the packages being conveyed. A competent engineer can custom design the guide system for each line of packages.

While the preferred embodiment of the guide system is adjusted by use of a handle mounted on a lever, it could also be adjusted by hand by rotating one of the mounting tubes or moving one of the guide rails.

A fixed guide rail 68 is shown behind the cross member 52 in the view of FIG. 2. Preferably such a fixed guide rail is positioned along one side of the conveyor. It is connected to a cross member 28 (not shown in FIG. 2) by a mounting bracket 88. The fixed guide rail 68 cooperates with the adjustable first and second guide rails 40 and 48 to align the packages during their movement on the conveyor.

Figure 3:
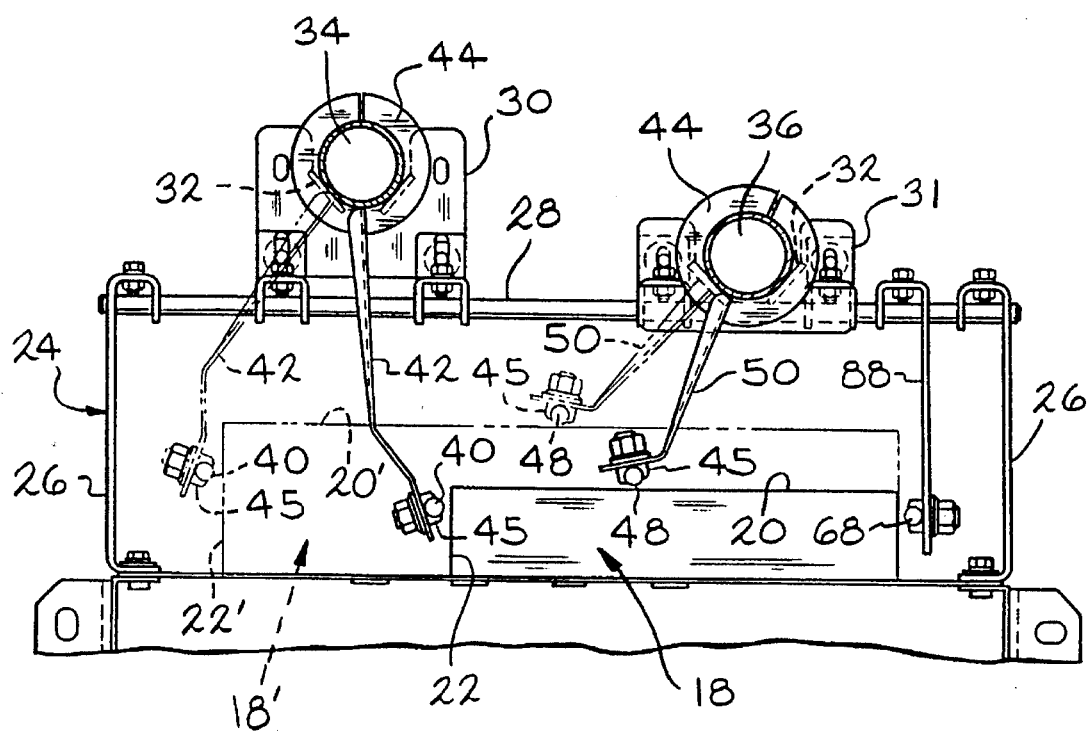
FIG. 3 is an end view of the control members and guide members of the conveyor system, taken from the right side of FIG. 1.

Referring now to FIG. 3, the mounting tubes and guide rails are shown at the end of the conveyor system. A frame 24 includes a pair of side members 26 and a cross member 28 connected therebetween. A pair of supports 30 and 31 are positioned on top of the cross member 28. A first mounting tube 34 is positioned in the recess 32 of one of the supports 30. A first guide rail 40 (shown at two alternate positions) is connected to the first mounting tube 34 by a first mounting bracket 42 extending therebetween. The first mounting bracket 42 is connected to the first mounting tube 34 at a collar 44 positioned around the first mounting tube 34, and it is connected to the first guide rail 40 by a barlock 45. A second mounting tube 36 is positioned in the recess 32 of the other support 31. A second guide rail 48 (shown at two alternate positions) is connected to the second mounting tube 36 by a second mounting bracket 50 extending therebetween. The second mounting bracket 50 is connected to the second mounting tube 36 at a collar 44 positioned around the second mounting tube 36, and it is connected to the second guide rail 48 by a barlock 45. A fixed guide rail 68 is connected to the cross member 28 by a mounting bracket 88.

As described above, the first and second mounting tubes 34 and 36 are interconnected so that one rotates dependent on rotation of the other. As a result, the first and second guide rails 40 and 48 connected thereto move together. Thus, the positioning and rotation of the first and second mounting tubes 34 and 36 can be coordinated so that the first and second guide rails 40 and 48 cooperate to align a package 18. Adjustment of the first and second mounting tubes 34 and 36 to a first pre selected position adjusts the first and second guide rails 40 and 48 to correctly align the side surface 22 and the upper surface 20 of a first package 18, respectively. When the conveyor system is changed over for use with a second package, adjustment of the first and second mounting tubes 34 and 36 to a second preselected position adjusts the first and second guide rails 40 and 48 to correctly align the side surface 22' and upper surface 20' of the second package 18'. Thus, the first and second mounting tubes 34 and 36 move cooperatively to accommodate a different size package.

FIG. 4 shows a side view of the first mounting tube 34 and its associated structures. A frame 54 is mounted on the conveyor 12, and a support 56 connected thereto extends upward therefrom. The support 56 includes a recess 58 in its upper surface. An adjuster panel 60 is connected to the top of the support 56. It includes a recess 62 in its lower surface which combines with the recess 58 of the support 56 to form an aperture 64. The first mounting tube 34 extends through the aperture 64. The adjuster panel 60 also includes a plurality of apertures 76 (only one of which is shown). A first lever 66 is attached to a collar 44 around the first mounting tube 34 to cause its rotation. The first lever 66 includes an aperture 79 which can be aligned with the aperture 76 of the adjuster panel 60. A pin 78 is positioned through the apertures 76 and 79 to fix their respective positions. A handle 74 is attached to the upper end 70 of the first lever 66 to facilitate its adjustment.

A frame 24 is mounted on the conveyor 12, and a support 30 is connected thereto. The first mounting tube 34 is positioned in the support 30. A first guide rail 40 is connected to the first mounting tube 34 by a first mounting bracket 42 extending therebetween. The first mounting bracket 42 is connected to the first mounting tube 34 at a collar 44 positioned around the first mounting tube 34, and it is connected to the first guide rail 40 by a barlock 45. It can be seen that the first mounting bracket 42 is generally in the shape of a rectangular plate (with partially formed flanges for added stiffness) which slightly tapers as it approaches the first mounting tube 34. As in FIG. 1, the frame 54, frame 24 and mounting bracket 42 have been shown exaggeratedly close to one another for purposes of illustration of the invention. In operation, they would be placed at a desired longitudinal position apart.

Figure 5:
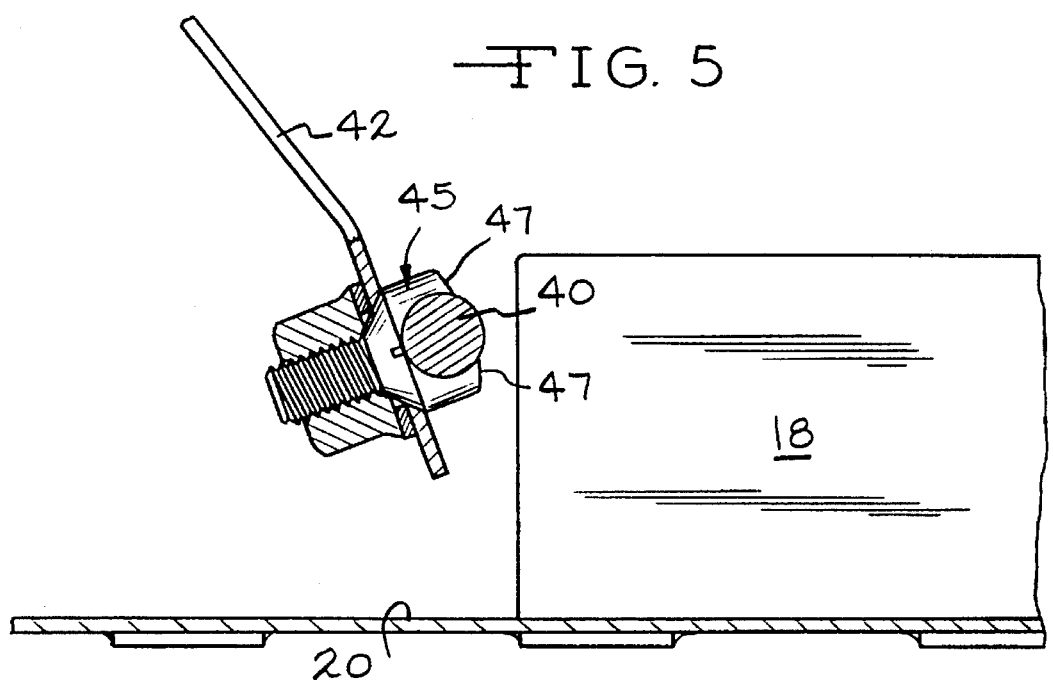
FIG. 5 is an end view, partially in cross section, of a connector for mounting a guide member to an arm.
Figure 6:
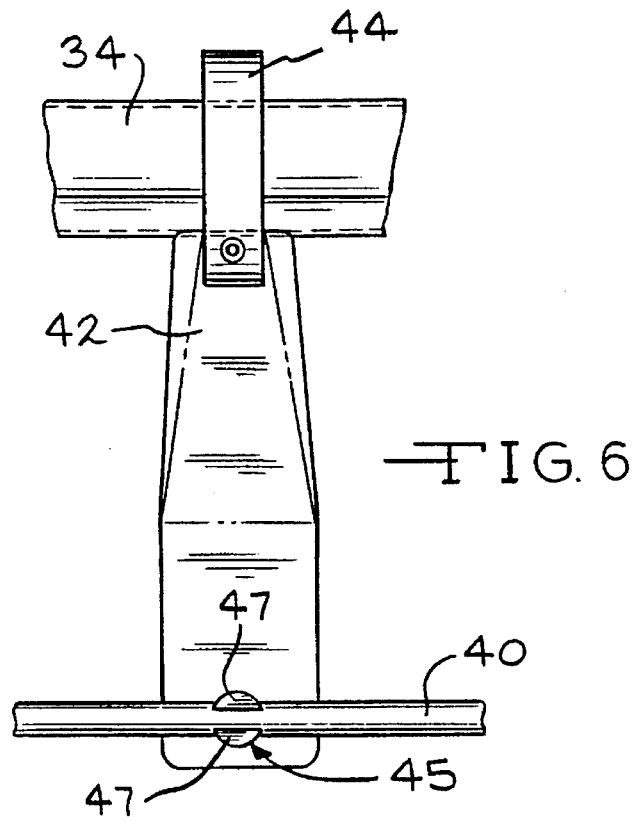
FIG. 6 is a side view showing a portion of a guide member mounted to an arm by a connector, and showing the arm connected to a portion of a control member.

FIGS. 5 and 6 further illustrate the barlock 45 connecting the first guide rail 40 to the first mounting bracket 42. Barlocks 45 are well known in the art, and generally comprise a tightenable clamp for firmly holding the first guide rail 40. When the first guide rail 40 is used to align a package 18, it is important that the barlock 45 avoid contact with the package. Otherwise, the barlock could interfere with the package's movement on the conveyor. It can be seen that the barlock 45 has beveled edges 47 so that they do not touch the package 18. The length of the mounting bracket 42 and its angle of rotation can also be adjusted for this purpose. FIG. 6 also shows the first mounting bracket 42 connected to the first mounting tube 34 by a collar 44.

Figure 7:
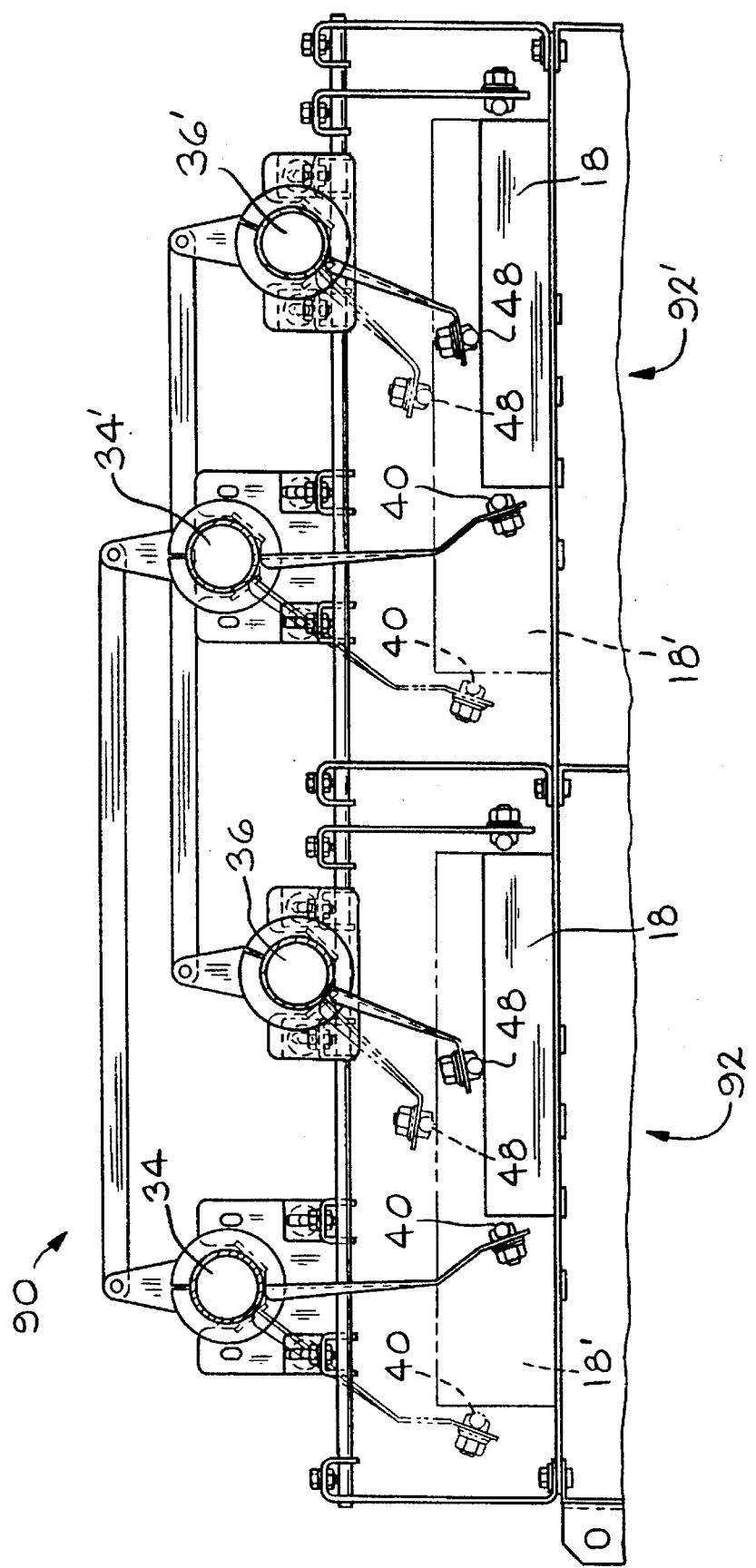
FIG. 7 is an end view of the control members and guide members of a multi-lane conveyor system in accordance with this invention.

Referring now to FIG. 7 along with FIG. 2, there is illustrated a multi-lane guide system for packages on a multi-lane conveyor system 90 in accordance with this invention. The conveyor system 90 can include two or more lanes 92 positioned side by side. The guide system in each lane includes first and second guide members such as first and second guide rails 40 and 48 for aligning the packages 18 as they move along the conveyor system. First and second control members such as first and second mounting tubes 34 and 36 are connected to and lie generally parallel to the first and second guide rails 40 and 48. Each of the mounting tubes can be rotated around its longitudinal axis to move its associated guide rail in a generally arcuate path, in order to adjust the guide rails to accommodate the different size of packages 18 and 18'. In a preferred embodiment, the first and second mounting tubes 34 and 36 in one lane are interconnected in the manner shown in FIG. 2 so that one rotates dependent on rotation of the other. In this embodiment, the first mounting tube 34 in one lane 92 is interconnected with the first mounting tube 34' in the other lane 92' so that one rotates dependent on rotation of the other, and the second mounting tube 36 in one lane 92 is interconnected with the second mounting tube 36' in the other lane 92' so that one rotates dependent on rotation of the other. In this manner, a single lever such as shown in FIG. 2 can be used to adjust the guide rails in both of the lanes. In another embodiment, the first and second mounting tubes in each lane are interconnected so that one rotates dependent on rotation of the other, but there is no interconnection between the lanes. The guide system in each lane is easily and rapidly adjusted.

Figure 8:
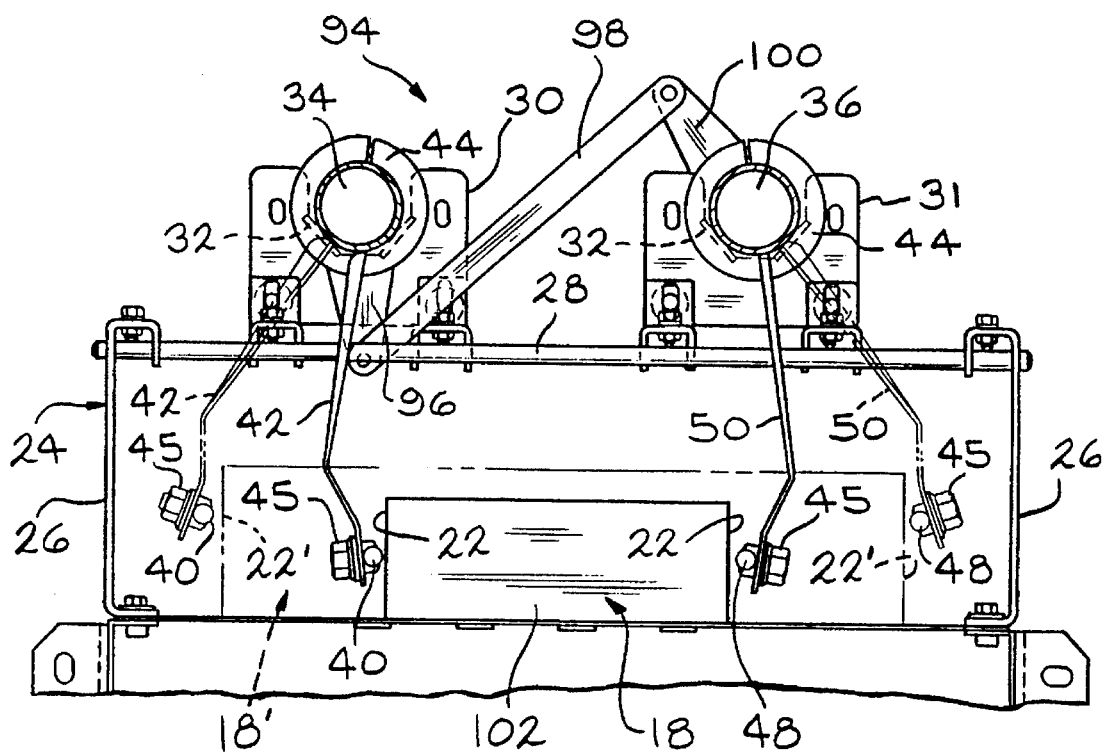
FIG. 8 is an end view of the control members and guide members of a second embodiment of the conveyor system.

Referring now to FIG. 8 along with FIG. 2, the mounting tubes and guide rails are shown at the end of a second embodiment of a conveyor system 94 in accordance with this invention. In this embodiment, the guide rails are adapted to align both side surfaces of each package about a centerline. Specifically, a frame 24 includes a pair of side members 26 and a cross member 28 connected therebetween. A pair of supports 30 and 31 are positioned on top of the cross member 28. A first mounting tube 34 is positioned in the recess 32 of one of the to supports 30. A first guide rail 40 (shown at two alternate positions) is connected to the first mounting tube 34 by a first mounting bracket 42 extending therebetween. The first mounting bracket 42 is connected to the first mounting tube 34 at a collar 44 positioned around the first mounting tube 34, and it is connected to the first guide rail 40 by a barlock 45. A second mounting tube 36 is positioned in the recess 32 of the other support 31. A second guide rail 48 (shown at two alternate positions) is connected to the second mounting tube 36 by a second mounting bracket 50 extending therebetween. The second mounting bracket 50 is connected to the second mounting tube 36 at a collar 44 positioned around the second mounting tube 36, and it is connected to the second guide rail 48 by a barlock 45.

As in FIG. 2, a first lever 66 is mounted in an adjuster panel 60 to cause rotation of the first mounting tube 34. However, the first lever 66 is not connected to a second lever 80 to cause rotation of the second mounting tube 36. Rather, the first and second mounting tubes 34 and 36 are interconnected at the position shown in FIG. 8 by a second lever 96, a third lever 98, and a fourth lever 100. Rotation of the first mounting tube 34 in one direction causes rotation of the second mounting tube 36 in the opposite direction. As a result, the first and second guide rails 40 and 48 connected thereto move together to adjust a package 18 along a centerline 102. Adjustment of the first and second mounting tubes 34 and 36 to a first preselected position adjusts the first and second guide rails 40 and 48 to correctly align each side surface 22 of a first package 18 about the centerline 102. When the conveyor system 94 is changed over for use with a second package 18', adjustment of the first and second mounting tubes 34 and 36 to a second preselected position adjusts the first and second guide rails 40 and 48 to correctly align each side surface 22' of the second package 18' about the centerline 102. Thus, the first and second mounting tubes 34 and 36 move cooperatively to accommodate a different size package.

While the guide system of this invention has been illustrated with respect to a pair of adjustable guide rails in each lane, the invention is equally applicable to a single adjustable guide rail. One of the mounting tubes and its associated guide rail can be removed from the illustrated embodiments. Further, other shapes and sizes of mounting tubes and guide rails can also be used. The associated structures can be modified to accommodate the different shapes and sizes.

Although the preferred mounting tubes and guide rails are formed from a metallic material such as stainless steel, they can also be formed from other materials such as plastics or composites. In a preferred embodiment, each mounting tube has a diameter between about 1½ inches (3.81 cm) and about 1¾ inches (4.45 cm), and each guide rail has a diameter of about ⅜ inch (0.95 cm), but other diameters are also suitable. The mounting tubes can also be solid instead of hollow, and the guide rails can be hollow instead of solid.

The guide system of this invention can be used for aligning any of a wide variety of different kinds of packages. For example, the packages can be cereal boxes, baked goods boxes, other boxes of packaged goods. The guide system can be used with bottles or other packages in addition to boxes.

The guide system can be adjusted through the use of air, electrical or hydraulic powered actuators. These can be part of an automatic control system which does not require any human intervention. However, the guide system is also very quick and easy to adjust by hand.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A guide system for packages on a conveyor system, said guide system comprising:

generally linear first and second guide members for aligning said packages as they move along the conveyor system, and generally linear first and second control members connected to and lying generally parallel to said first and second guide members, respectively, wherein each of said control members can be rotated around its longitudinal axis to move its associated guide member in a generally arcuate path, in order to adjust said guide members to accommodate different sizes of packages.

2. The guide system defined in claim 1 wherein said first and second control members are interconnected so that one rotates dependent on rotation of the other.

3. The guide system defined in claim 2 wherein said first and second control members are connected to said first and second guide members, respectively, by a plurality of arms extending therebetween, wherein said arms are positioned along substantially the entire length of each of said guide members, and wherein said rotation of said control members moves substantially all of said arms to move substantially the entire length of each of said guide members in a generally arcuate path, in order to adjust said guide members to accommodate different sizes of packages.

4. The guide system defined in claim 2 additionally comprising a lever connected to at least one of said control members, wherein said lever is operable to cause said rotation of each of said control members, and wherein said operation of said lever moves substantially the entire length of each of said guide members in a generally arcuate path, in order to adjust said guide members to accommodate different sizes of packages.

5. The guide system defined in claim 2 wherein said conveyor system has a conveying surface adapted to move said packages along a direction, wherein said packages have an upper surface generally parallel to said conveying surface and two side surfaces extending generally parallel to said direction, and wherein said first guide member is adapted to align one of said side surfaces and said second guide member is adapted to align said upper surface.

6. The guide system defined in claim 2 wherein said conveyor system has a conveying surface adapted to move said packages along a direction, wherein said packages have two side surfaces extending generally parallel to said direction, and wherein said first and second guide members are adapted to align said side surfaces about a centerline.

7. The guide system defined in claim 1 wherein said conveyor system has a conveying surface adapted to move said packages along a direction, wherein said packages have an upper surface generally parallel to said conveying surface and two side surfaces extending generally parallel to said direction, and wherein said first guide member is adapted to align one of said side surfaces and said second guide member is adapted to align said upper surface.

8. The guide system defined in claim 1 wherein rotation of each of said control members moves substantially the entire length of its associated guide member in a generally arcuate path, in order to adjust substantially the entire length of each of said guide members to accommodate different sizes of packages.

9. The guide system defined in claim 1 wherein each of said control members is connected to its associated guide member by a plurality of arms extending therebetween.

10. The guide system defined in claim 9 wherein each of said control members is connected to its associated guide member by a single arm at a plurality of locations along the lengths of the control member and guide member.

11. The guide system defined in claim 1 wherein said generally arcuate path of said guide member is in the same rotational direction as said rotation of said control member.

12. The guide system defined in claim 1 wherein said generally arcuate path of said guide member is coaxial with said control member.

13. A guide system for packages on a conveyor system, said guide system comprising:

a generally linear guide member for aligning an upper surface of said packages as they move along the conveyor system, said upper surface of said packages being generally parallel to a conveying surface of said conveyor system, and a generally linear control member connected to and lying generally parallel to said guide member, wherein said control member can be rotated around its longitudinal axis to move said guide member in a generally arcuate path, in order to vertically adjust said guide member to accommodate different sizes of packages.

14. The guide system defined in claim 13 wherein rotation of said control member moves substantially the entire length of said guide member in a generally arcuate path, in order to vertically adjust substantially the entire length of said guide member to accommodate different sizes of packages.

15. The guide system defined in claim 13 wherein said control member is connected to said guide member by a single arm at a plurality of locations along the lengths of the control member and guide member.

16. The guide system defined in claim 13 wherein said generally arcuate path of said guide member is in the same rotational direction as said rotation of said control member.

17. The guide system defined in claim 13 wherein said generally arcuate path of said guide member is coaxial with said control member.

18. A multi-lane guide system for packages on a multi-lane conveyor system, said guide system in each lane comprising:

generally linear first and second guide members for aligning said packages as they move along the conveyor system, and generally linear first and second control members connected to and lying generally parallel to said first and second guide members, respectively, wherein each of said control members can be rotated around its longitudinal axis to move its associated guide member in a generally arcuate path, in order to adjust said guide members to accommodate different sizes of packages.

19. The multi-lane guide system defined in claim 18 wherein said first and second control members in each lane are interconnected so that one rotates dependent on rotation of the other.

20. The multi-lane guide system defined in claim 18 wherein said first and second control members in one lane are interconnected so that one rotates dependent on rotation of the other, wherein each of said first control members is interconnected with another of said first control members so that one rotates dependent on rotation of the other, and wherein each of said second control members is interconnected with another of said second control members so that one rotates dependent on rotation of the other.

* * * * *